United States Patent
Carlèn

(10) Patent No.: US 8,040,528 B2
(45) Date of Patent: Oct. 18, 2011

(54) METHOD FOR TARGET TRACKING, AND ASSOCIATED TARGET

(75) Inventor: Johan Carlèn, Vallentuna (SE)

(73) Assignee: Trimble AB, Danderyd (SE)

( * ) Notice: Subject to any disclaimer, the term of this patent is extended or adjusted under 35 U.S.C. 154(b) by 207 days.

(21) Appl. No.: 12/451,086

(22) PCT Filed: May 30, 2007

(86) PCT No.: PCT/EP2007/004771
§ 371 (c)(1),
(2), (4) Date: Oct. 26, 2009

(87) PCT Pub. No.: WO2008/145158
PCT Pub. Date: Dec. 4, 2008

(65) Prior Publication Data
US 2010/0085579 A1    Apr. 8, 2010

(51) Int. Cl.
*G01B 11/14*    (2006.01)
(52) U.S. Cl. ................................................... 356/614
(58) Field of Classification Search ........... 356/614–624
See application file for complete search history.

(56) References Cited

U.S. PATENT DOCUMENTS

| 6,266,142 | B1 * | 7/2001 | Junkins et al. ............... 356/623 |
| 2005/0105772 | A1 | 5/2005 | Voronka et al. |
| 2006/0201007 | A1 | 9/2006 | Pickutowski |

FOREIGN PATENT DOCUMENTS
EP    1 186 860    3/2002
* cited by examiner

*Primary Examiner* — Tarifur Chowdhury
*Assistant Examiner* — Tara S Pajoohi
(74) *Attorney, Agent, or Firm* — Harness, Dickey & Pierce, P.L.C.

(57) ABSTRACT

A method for determining rotational position of a target in a target tracking System is disclosed. The target comprises a plurality of light emitting elements arranged circumferentially around the target. The target tracking System further comprises a tracker unit capable of detecting light emitted by said light emitting elements. The method comprises the Steps of emitting from said light emitting elements an omni-directional synchronization signal; detecting in the tracker unit said synchronization signal; activating said light emitting elements sequentially starting from a reference direction, wherein each light emitting element is activated for a predetermined time and emits light during the time it is activated; detecting in the tracker unit a time when a maximum amount of light is received from the target; and calculating the reference direction for the target relative to a coordinate System based on the time interval between detection of the synchronization signal and the detection of a maximum amount of light received from the target. An active target for use in the method is also disclosed.

8 Claims, 3 Drawing Sheets

METHOD FOR TARGET TRACKING, AND ASSOCIATED TARGET

TECHNICAL FIELD

The present disclosure relates generally to target tracking systems. More particularly, the present disclosure relates to active targets comprising emitters for use in tracking moving objects, for example where a robotic total station continuously tracks the movement of the object using signals emitted by said emitters.

BACKGROUND

In the construction industry, there is an increasing demand for high-precision positioning of machines such as graders and dozers. At a building site, both logistics and construction accuracy may call for individual tracking of each machine or vehicle at the site.

To this end, there are systems based on advanced tracking sensors and robotic total stations, which remotely track and measure a kinetic moving target and continuously send measured data to a controlling computer or the like.

Recently, three-dimensional (3D) machine control operations have become increasingly important. Three-dimensional data from design software is employed onboard a construction machine, facilitating a comprehensive site control. The kinetic movement of the construction machine is continuously monitored by means of surveying apparatus, and the position, orientation, attitude, etc. of the machine is forwarded to an on-board controlling computer. The on-board computer calculates control data for the construction machine, based on the current position and orientation as compared to the three-dimensional design.

If the construction machine is manually controlled by an operator, the operator is provided with an indication about the correctness of machine position. For example, the operator may be given information about height and angle for an earth-moving blade. Based on such information, the operator may alter the position of the blade accordingly, if required.

For an automated machine control system, a controlling computer controls the entire system and automatically changes the position of the construction machine according to the three-dimensional design by providing appropriate control signals for example to hydraulic valve control systems of the machine.

Various types of construction machines can be equipped with a machine control system of this kind. Graders and dozers have been the typical earth-moving machines which were controlled and monitored by such systems. More recently, pavers, rollers and excavators have also been controlled in this manner. However, machine control systems are not limited to just construction machines. Three-dimensional control systems may be used also in hydrographical marine applications and in real-time kinetic railroad measurements, to name a few.

In order to obtain the positional data about the construction machine, or an earth-moving blade attached to such machine, a target is typically mounted on the machine or on a blade or similar attached to the machine. The target may, for example, include retro-reflecting prisms which are used as targets for an electronic distance measurement beam emitted from a total station. Suitably, such prisms are circumferentially arranged in the target, in order to provide for the possibility of measuring target position from any direction. The target may alternatively, instead of using prisms, be provided with other reflecting surfaces, such as a reflecting tape. Various suitable types of targets for distance measurement are known in the art.

Moreover, in order to facilitate tracking of the target by means of a robotic total station, the target may comprise emitters, such as light emitting diodes or the like. Such emitters may be designed to emit a coded signal to the robotic total station in order to identify the target. For example, each construction machine or target at a site may be given a unique identity, and information about this identity may be emitted by means of these emitters. Any receiving total station may then compare this identity with a known set of identities, in order to determine which unique construction machine (or which target) it is currently tracking.

An active target having emitters according to the above also facilitates the robotic tracking, since a tracking function can be implemented in the total station separate from its distance measuring capabilities.

Hence, there are known systems for real-time tracking of machines and tools, as described above, at a work site. This is particularly convenient when using three-dimensional design, as explained.

However, although these systems have indeed been successful, there is still room for improvement. For example, when a robotic total station continuously tracks for example a blade on a vehicle, it can determine its kinetic movement but there is no way of knowing if the vehicle is moving in a forward direction or if it is reversing. In addition, if the vehicle is not moving at all, there is no way of determining the forward direction thereof. The prior art has required a plurality of targets mounted on a single machine or vehicle in order to allow determination of its rotational (or directional) position.

SUMMARY

This disclosure provides a method and a target which allow for determining the rotational or directional position of a single target.

According to the present invention, the rotational position of a target is determined at a tracker unit, for example a robotic total station, by detecting light emitted from a plurality of emitters at the target. The target emitters first emit an omni-directional synchronization signal. Following the synchronization signal, each of the emitters is activated one at a time or in groups sequentially, starting with a predetermined emitter. By detecting the emitted light at the tracker unit, and determining when the strongest signal (amplitude) from the target is detected, the time difference can be determined between the time of the synchronization signal and the time of the strongest signal from an individual emitter. From this information, the rotational position of the target (its reference direction) relative to a coordinate system known to the tracker unit can be calculated.

In a preferred embodiment, detected amplitudes from at least two emitters are used for determining the rotational position of the target. Using not only one, but two or more detected amplitudes provides for an improved accuracy when determining the target rotational position relative to the coordinate system. Improved rotational accuracy for the target is then obtained by interpolating between detected amplitudes for adjacent emitters.

Suitably, the synchronization signal may be coded (modulated) in order to indicate an identity of the target sending out the synchronization signal.

An active target for a target tracking system according to the present invention comprises a plurality of emitters, such as light emitting diodes, arranged circumferentially around the target; and control circuitry for activating the emitters in two successive phases, wherein the first phase includes emission of a synchronization signal and the second phase includes sequential activation of the emitters starting from a reference direction (a reference emitter). During the second phase, each emitter is activated for a predetermined time.

BRIEF DESCRIPTION OF THE DRAWINGS

In the following detailed description, reference is made to the accompanying drawings, on which.

Throughout the drawings, like parts are designated by like reference numerals.

DETAILED DESCRIPTION

In one embodiment of the present invention, a target for a tracking system comprises a plurality of circumferentially arranged emitters. The emitters may suitably be light emitting diodes, emitting for example in the visible or infrared region of the electromagnetic spectrum. The signals emitted by these emitters are detectable by, for example, a robotic total station.

In order to provide for a determination of the rotational position of the target, there is a defined reference direction for the target.

To determine the rotational position of the target, a synchronization signal (or synchronization pattern) is first emitted from the emitters in all directions. For example, a plurality of (typically all) the emitters may be activated simultaneously to send out a steady signal. Alternatively, the emitters may be activated to send out a coded signal (pattern) indicative of the target identity. The synchronization signal is detected by the total station, which can take the detection of this synchronization signal as a trigger for rotational position determination.

Once the synchronization signal has been emitted, a procedure is initiated in the target wherein the emitters are activated sequentially around the circumference of the target at a predetermined rate, starting from a reference emitter. The total station continuously detects the emission from the target, and determines at which point in time the strongest emission (amplitude) is detected. As will be understood, the strongest emission will be detected when the emitter facing the total station is activated at the target. By determining the time of the synchronization signal and the time of the strongest emitter signal, the total station can determine which of the circumferentially arranged emitters, relative to the reference emitter, is facing the total station. Thereby, the rotational position of the target relative to a coordinate system known to the total station can be determined.

The sequential activation of the emitters, starting from the reference emitter, may suitably be initiated at a predetermined point in time following the synchronization signal.

Suitably, the target is mounted in such a way that the reference emitter will be in the forward direction of the construction machine or the like. However, as will be understood, the reference emitter may have any orientation with respect to the construction machine, as long as the relative orientation of the reference emitter with respect to the machine is known.

Figure 1:
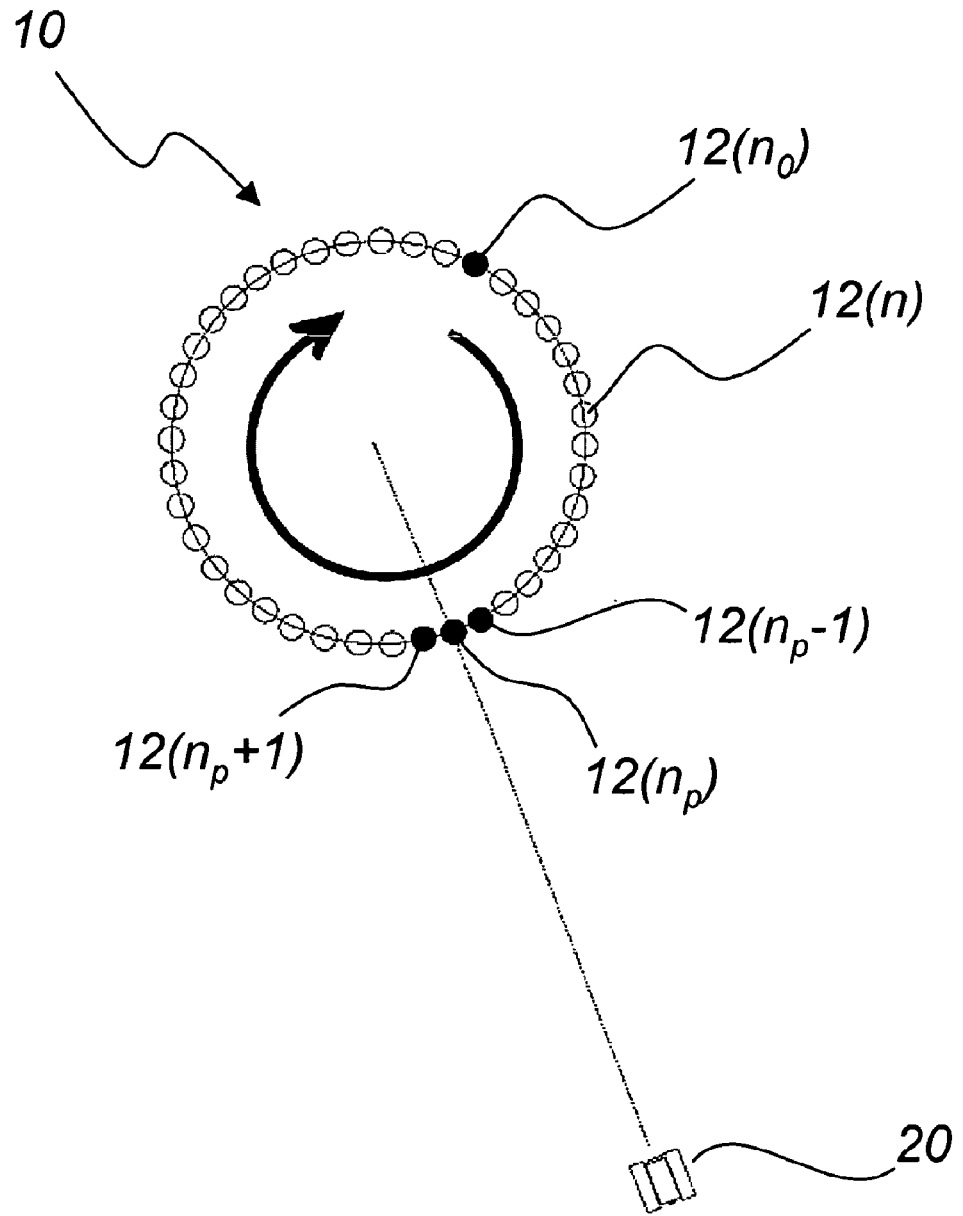
FIG. 1 schematically shows an implementation of the inventive principle.

FIG. 1 schematically shows one implementation of the inventive principle, wherein for the sake of clarity only the emitters are shown together with a schematically illustrated robotic total station. In this embodiment, the target 10 comprises forty (40) circumferentially arranged light emitting diodes (LEDs) 12. During the sequential activation, each LED is lit up for approximately 40 ms one at the time in this embodiment, starting from a reference emitter 12($n_0$). Thus, it will take about 1.6 s before all forty LEDs have been activated. For this embodiment, having 40 LEDs circumferentially arranged on the target, the rotational position can typically be determined to an accuracy of about +/−5 gon (400 gon/40 LEDs).

In FIG. 1, there is also schematically shown a robotic total station 20, having its line of sight aimed towards the target 10. By detecting light emitted by the LEDs, the total station 20 may determine when the closest LED 12($n_p$) is lit up, since this LED will give the strongest signal (detected amplitude) at the total station 20.

The accuracy in determining the rotational position of the target 10 can be further improved by activating not only one emitter at the time, but to activate more, say three, emitters using different modulation frequencies for the emitted signal and determining the detected amplitude separately for each modulation frequency. It is then possible to interpolate the signal strength from the three simultaneously activated emitters, and to determine the rotational position of the target more accurately than what would be feasible based on only one emitter. Referring again to FIG. 1, LEDs 12($n_p$−1), 12($n_p$) and 12 ($n_p$+1) may be simultaneously activated (using different modulation frequencies) to provide for a determination of the rotational position at a higher accuracy. For example, LED 12($n_p$) may be the closest emitter (strongest signal), but if the signal from LED 12($n_p$−1) is stronger than the signal from LED 12($n_p$+1), then it can be deduced that the closest portion of the target to the total station is somewhere between LED 12($n_p$) and LED 12($n_p$−1). In this manner, the rotational position of the target can be determined in smaller steps than the circumferential separation between the LEDs.

Consider, for example, a situation where the emitter having the highest detected amplitude has been determined, e.g. emitter 12($n_p$). Once the identity of this emitter has been determined, the amplitudes of the adjacent emitters, e.g. emitters 12($n_p$−1) and 12($n_p$+1), immediately before and after (to the right and to the left) are compared. The amplitude of the one adjacent emitter having the higher amplitude is then compared to the center emitter (i.e. the emitter 12($n_p$) determined to have the overall highest detected amplitude). The rotational position of the target can then be determined to a higher accuracy by interpolating the detected amplitudes, based on the known shape of the emission characteristics of the emitters, such as the shape of the emitted lobe of radiation.

It is also possible to make the above interpolation using sequential activation of the emitters one at the time. Thus, instead of activating three emitters simultaneously at different modulation frequencies, it is possible to use the one-by-one sequential activation and determine each respective amplitude.

Alternatively, two emitters may be activated in pairs, using different modulation frequencies for the diodes of each pair. For example, by first activating two emitters using different modulation frequencies (emitter 12($n_p$−1) at frequency $f_1$, and emitter 12($n_p$) at frequency $f_2$) and then activating one of these emitters together with a third emitter (emitter 12($n_p$) at frequency $f_2$ and emitter 12($n_p$+1) at frequency $f_3$), it is also possible to determine each detected amplitude and make the interpolation for improved accuracy. Note that since, in this example, emitter $12(n_p-1)$ and emitter $12(n_p+1)$ in the example above are not activated at the same time, they may use the same modulation frequency, i.e. $f_1=f_3$.

For example, as a non-limiting example, the LEDs may emit infrared light at approximately 780 nm.

Figure 2:
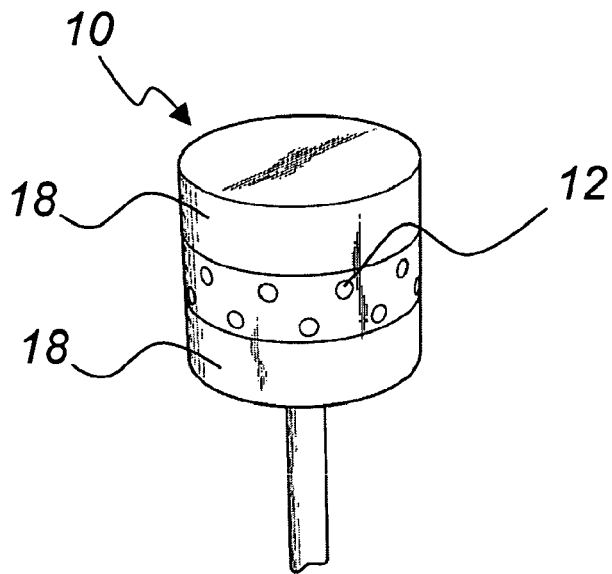
FIGS. 2-4 schematically show different embodiments of target configurations.
Figure 3:
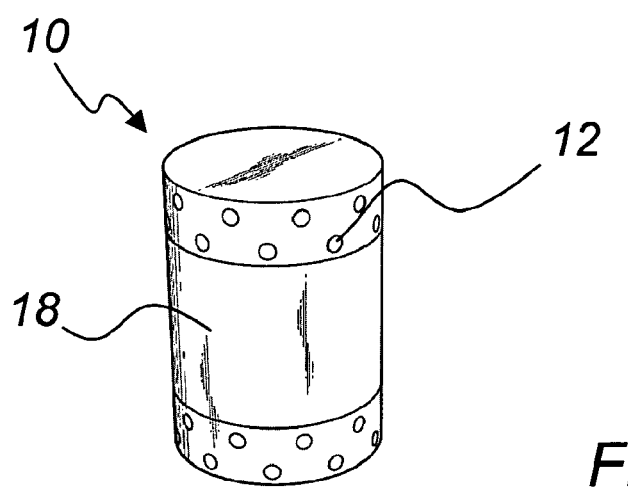
Figure 4:
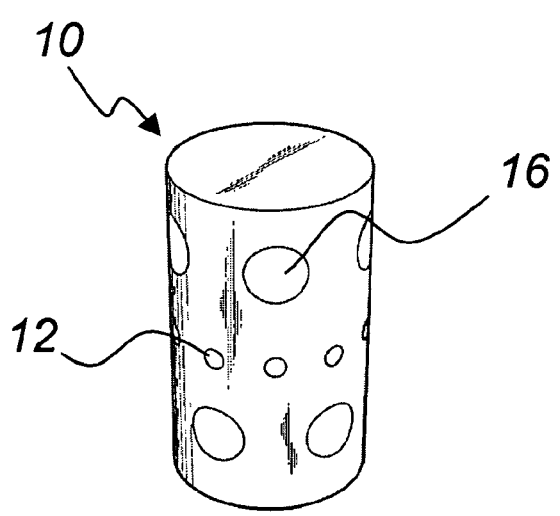

FIGS. 2-4 schematically show some embodiments of target configurations. In the embodiment as shown in FIG. 2, the emitters 12 are arranged circumferentially around the target in a zigzag configuration. The zone comprising the emitters is surrounded by reflecting surfaces 18 which have the purpose of reflecting a beam for electronic distance measurement sent from the total station. FIG. 3 shows a similar target, but the reflecting zone 18 is now situated centrally between two zones where the emitters 12 are located. Yet another embodiment is shown in FIG. 4, in which reflecting prisms 16 are used instead of reflecting surfaces. In FIG. 4, the emitters are arranged in a circle around the target, rather than in a zigzag configuration as in FIGS. 2 and 3.

Figure 5:
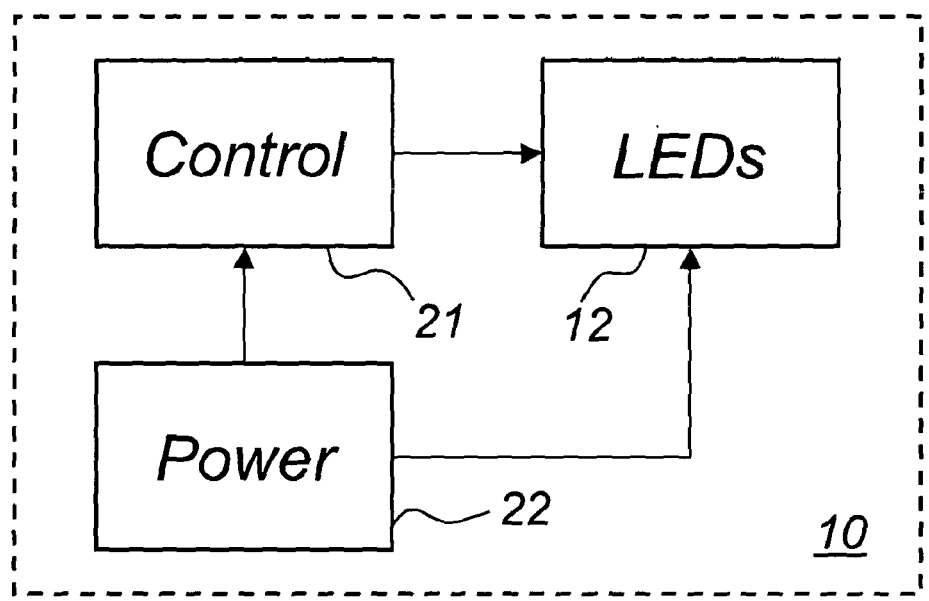
FIG. 5 is a block diagram schematically showing functional components of an active target according to the invention.
Figure 6:
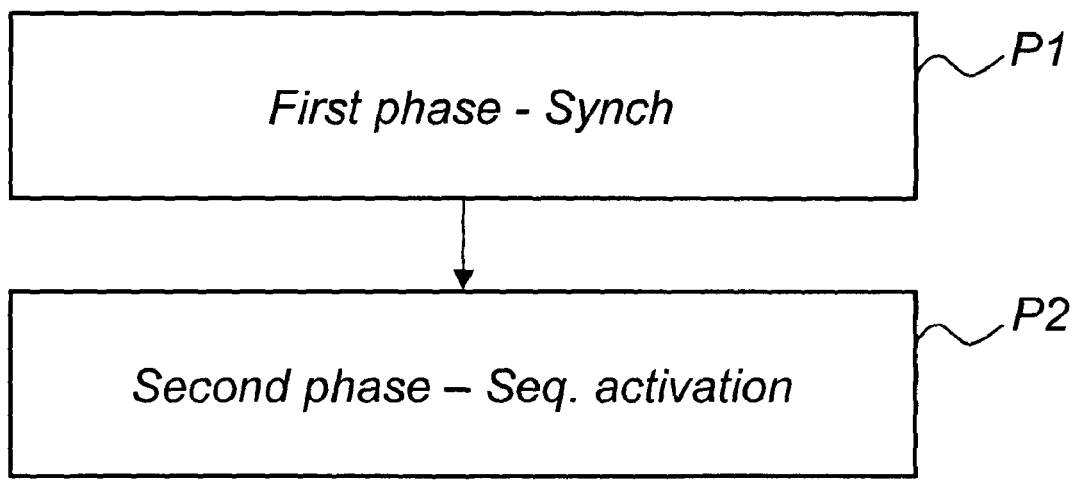
FIG. 6 schematically illustrates two activation phases for the emitters of the target.

FIG. 5 is a block diagram schematically showing functional components of an active target 10 according to the invention. The active target comprises control circuitry 21 for controlling the emitters 12, and a power source 22 for providing power to the control circuitry 21 and to the emitters 12. The control circuitry is operative to activate the emitters (typically LEDs) in two successive phases P1 and P2, as shown in FIG. 6. In a first phase P1, the control circuitry drives a plurality of (preferably all) the emitters to simultaneously emit a synchronization signal. This synchronization signal is used as a trigger in the monitoring robotic total station to begin rotational position determination, and a synchronization time is registered. The control circuitry may advantageously drive the emitters to emit a coded synchronization signal indicative of the identity of the target. In a second phase P2, the control circuitry is operative to activate the emitters sequentially. The second phase is typically initiated a predetermined time after the synchronization signal has been emitted. As described above, the sequential activation of the emitters is used for determining the rotational position of the target. In some of the method embodiments described above, the control circuitry is also operative, in the second phase, to drive the emitters such that they emit a modulated signal (cf. the description relating to improved accuracy above). The modulation frequency used for each individual emitter may be used for identifying each emitter at the total station.

Although the invention has been described by reference to particular embodiments as schematically shown on the drawings, it should be understood that various modifications and alterations may be made without departing from the scope of the invention as defined in the appended claims.

The invention claimed is:

1. A method for determining rotational position of a target in a target tracking system, said target comprising a plurality of light emitting elements arranged circumferentially around the target, and said target tracking system further comprising a tracker unit capable of detecting light emitted by said light emitting elements, the method comprising:
    emitting from a plurality of said light emitting elements an omnidirectional synchronization signal;
    detecting in the tracker unit said synchronization signal;
    activating said light emitting elements sequentially starting from a reference direction, wherein each light emitting element is activated for a predetermined time and emits light during the time it is activated; detecting in the tracker unit a time when a maximum amount of light is received from the target; and
    calculating the reference direction for the target relative to a coordinate system based on the time interval between detection of the synchronization signal and the detection of a maximum amount of light received from the target.

2. The method of claim 1, wherein the light emitting elements are activated sequentially such that at least two emitters are activated simultaneously, and wherein the signals from the activated emitters are used for calculating the reference direction.

3. The method of claim 2, wherein any two emitters simultaneously activated emit light at different modulation frequencies.

4. The method of claim 1, wherein the step of calculating the reference direction comprises an interpolation step based on detected amplitude from at least two adjacent light emitting elements.

5. The method of claim 1, wherein the synchronization signal is modulated to indicate an identity of the target.

6. An active target for a target tracking system, said active target comprising: a plurality of light emitting elements arranged circumferentially around said target; control circuitry in the target coupled to said light emitting elements, for activating the light emitting elements in two successive phases, wherein a first phase includes activating a plurality of the light emitting elements simultaneously to emit an omnidirectional synchronization signal; and a second phase includes activating the light emitting elements sequentially starting from a reference direction, wherein each light emitting element is activated for a predetermined time and emits light during the time it is activated.

7. The active target of claim 6, wherein the control circuitry is operative to activate the plurality of light emitting elements during the first phase to emit a modulated signal indicative of a target identity.

8. The active target of claim 6, wherein the control circuitry is operative to activate the light emitting elements during the second phase such that any two simultaneously activated light emitting elements emit light at different modulation frequencies.

* * * * *